United States Patent
Speeney et al.

(10) Patent No.: US 6,570,983 B1
(45) Date of Patent: May 27, 2003

(54) METHOD AND SYSTEM FOR AUDIBLY ANNOUNCING AN INDICATION OF AN IDENTITY OF A SENDER OF A COMMUNICATION

(75) Inventors: Joseph A. Speeney, Basking Ridge, NJ (US); Ted Stine, Belle Mead, NJ (US)

(73) Assignee: AT&T Wireless Services, Inc., Redmond, WA (US)

( * ) Notice: Subject to any disclaimer, the term of this patent is extended or adjusted under 35 U.S.C. 154(b) by 61 days.

(21) Appl. No.: 09/899,963

(22) Filed: Jul. 6, 2001

(51) Int. Cl.$^7$ ................................................ H04M 1/57
(52) U.S. Cl. .............................. 379/373.02; 379/88.01; 379/373.03; 379/373.04; 379/374.02
(58) Field of Search .......................... 379/67.1, 88.01, 379/88.16, 88.19, 88.2, 88.21, 88.22, 142.06, 142.14, 373.01, 373.02, 373.03, 373.04, 374.02, 911; 455/415, 567; 340/7.58, 7.62; 704/270, 274

(56) References Cited

U.S. PATENT DOCUMENTS

| | | | |
|---|---|---|---|
| 5,289,530 A | | 2/1994 | Reese |
| 5,481,594 A | | 1/1996 | Shen et al. .................... 379/67 |
| 5,511,111 A | * | 4/1996 | Serbetcioglu et al. .... 379/88.01 |
| 5,526,406 A | * | 6/1996 | Luneau ........................ 455/563 |
| 5,661,788 A | * | 8/1997 | Chin ....................... 379/142.01 |
| 5,727,045 A | * | 3/1998 | Kim ......................... 379/88.18 |
| 5,745,562 A | * | 4/1998 | Penning ................. 379/215.01 |
| 5,796,806 A | | 8/1998 | Birckbichler ................ 379/67 |
| 5,850,435 A | | 12/1998 | Devillier |
| 5,875,232 A | * | 2/1999 | Wolf ....................... 379/88.19 |
| 5,903,628 A | * | 5/1999 | Brennan .................. 379/88.21 |
| 5,933,488 A | | 8/1999 | Marcus et al. |
| 5,999,599 A | * | 12/1999 | Shaffer et al. ........... 379/93.23 |
| 6,072,859 A | * | 6/2000 | Kong ....................... 379/88.16 |
| 6,108,630 A | * | 8/2000 | Kuechler et al. ........... 704/270 |
| 6,160,876 A | | 12/2000 | Moss et al. |
| 6,173,041 B1 | | 1/2001 | Borland et al. |
| 6,178,232 B1 | | 1/2001 | Latter et al. |
| 6,219,414 B1 | | 4/2001 | Macviejewski et al. ..... 379/215 |
| 6,400,809 B1 | * | 6/2002 | Bossemeyer et al. .... 379/88.21 |

FOREIGN PATENT DOCUMENTS

EP        1 069 750        1/2001

OTHER PUBLICATIONS

Wildfire Communications, Inc. homepage; http://www.wildfire.com (Downloaded Jun. 25, 2001).
Wildfire Communications, Inc. Frequently Asked Questions web page; http://www.wildfire.com/faq.asp (Downloaded Jun. 25, 2001).

* cited by examiner

Primary Examiner—Scott L. Weaver
(74) Attorney, Agent, or Firm—Kenyon & Kenyon

(57) ABSTRACT

A method and system to generate a communications identification announcement including an indication of an identity of an author of an incoming communication is disclosed. In an embodiment the method. Includes receiving a communication having a communication identifier and then searching a database to match the communication identifier to a data or audio file in the database that had been mapped to the communication identifier. If the communication identifier is located, then the data or audio file having the communications identification announcement including the identity of the author of the communication is announced to the contacted party. If the communication identifier is not located, then a previously stored announcement, generated in anticipation of failing to locate the communication identifier, may be broadcast. In an embodiment, the system to announce sounds indicative of an identity of a calling party may include a controller, a memory, a network interface unit, input and output devices, and database interface to access a subscriber database, the subscriber database containing one or more communication identifiers designated by the subscriber, each communication identifier corresponding to a particular contacting party.

6 Claims, 4 Drawing Sheets

METHOD AND SYSTEM FOR AUDIBLY ANNOUNCING AN INDICATION OF AN IDENTITY OF A SENDER OF A COMMUNICATION

TECHNICAL FIELD

The invention relates to an audible announcement of an indication of an identity of a sender of a communication.

BACKGROUND OF THE INVENTION

In wireless and wireline telephony applications, a called party is usually notified that a calling party has called by some type of a notification alert. The notification alert may typically be an audio alert. For example, the called party in a telephony application may hear a ringer of a telephone. A visual alert may also be used, such as a blinking light.

A caller identification ("ID") function adds another type of visual alert for the called party. With caller ID, the called party may see a telephone number, and perhaps a name, of a calling party. Electronic mail ("e-mail") applications may provide audible and visual notification alerts as well. When a receiving party receives an e-mail, a notification alert, such as an audible beep and/or the appearance of an icon on a monitor coupled to a computer running the e-mail application, might be presented to the receiving party. The e-mail address of the sending party may be displayed on the monitor of the receiving party.

In either exemplary application, in order for the contacted party to associate a notification alert with an incoming communication from a contacting party, the contacted party must at least divert his or her visual attention from the application presently being worked on and redirect that visual attention to the caller ID display of the telephone or the computer monitor display of the e-mail application. This diversion of visual attention may cause the contacted party to lose continuity with whatever process he or she had been working on before receipt of the notification alert. If the visual notification alert presents only a telephone number, or only an e-mail address, then the contacted party may be required to mentally recollect the identity of the contacting party associated with that notification alert.

SUMMARY OF THE INVENTION

The invention relates to method and system for generating an audible announcement that may include an indication of an identity of a sender of an incoming communication. In one embodiment, the method may include receiving a communication having a communication identifier and then searching a database of a subscriber, or contacted party, to match the communication identifier to a data or audio file in the database that had been mapped to the communication identifier. If the communication identifier is located, then at least a portion of the data or audio file including data indicative of the identity of the author of the communication may be audibly announced to the contacted party. If the communication identifier is not located, then the method of the invention may include performance of various subscriber options including audibly announcing a previously stored announcement, generated in anticipation of a failure to locate the communication identifier.

In another embodiment, a communications identification announcement device that audibly announces an indication of an identity of a sender of a communication may include a memory including a database, a controller, and an output device. The controller may receive a communication having a communication identifier from a contacting party. The communication may be directed to a subscriber. The controller may locate the communication identifier in a subscriber database, and retrieve an audio file corresponding to the located communication identifier. The controller may then output the contents of the audio file to the output device, such as a speaker.

BRIEF DESCRIPTION OF THE DRAWINGS

The various features of the invention will best be appreciated by simultaneous reference to the description which follows and the accompanying drawings, in which.

DETAILED DESCRIPTION

In accordance with an embodiment of the invention, a contacted party may, upon initial receipt of a communication, hear an indication of the identity of the author (i e., a contacting party) of the incoming communication. The indication may be announced from the contacted party's premises equipment, or from the contacted party's portable equipment. For example, in a telephony application, after the first ring of the telephone, and before the telephone is raised off-hook, a recorded voice may announce the name of the calling party. Alternatively, for example, in an e-mail application, upon receipt of an e-mail from a sending party, and before the e-mail message is opened by the receiving party, a recorded voice may announce the name of the sending party. Nothing herein is meant to restrict the disclosed invention to use with telephony and email applications as other applications may have contacting and contacted parties. One such example of other applications relates to instant message applications or wireless related applications. The present invention clearly also applies in these contexts.

Other types and methods of communication are within the scope of the invention. For ease of explanation, as used hereinafter, the words "calling" and "Sending" will be synonymous with the word "contacting" and the words "called" and "receiving" will be synonymous with the word "contacted". The invention may be provided in a wide range of manners, including, for example, in a suite that may include call forwarding or caller ID. The invention may, for example, be hosted remotely by a local telephone company or another local service, or it may be hosted locally on equipment of a subscriber. The invention could be used, for example, on a pay-as-you-go basis or as part of a service plan and therefore the invention may be considered as a subscriber system. However, the subscriber may be considered, and may be referred to herein, alternately as the subscriber of the contacted party.

Figure 1:
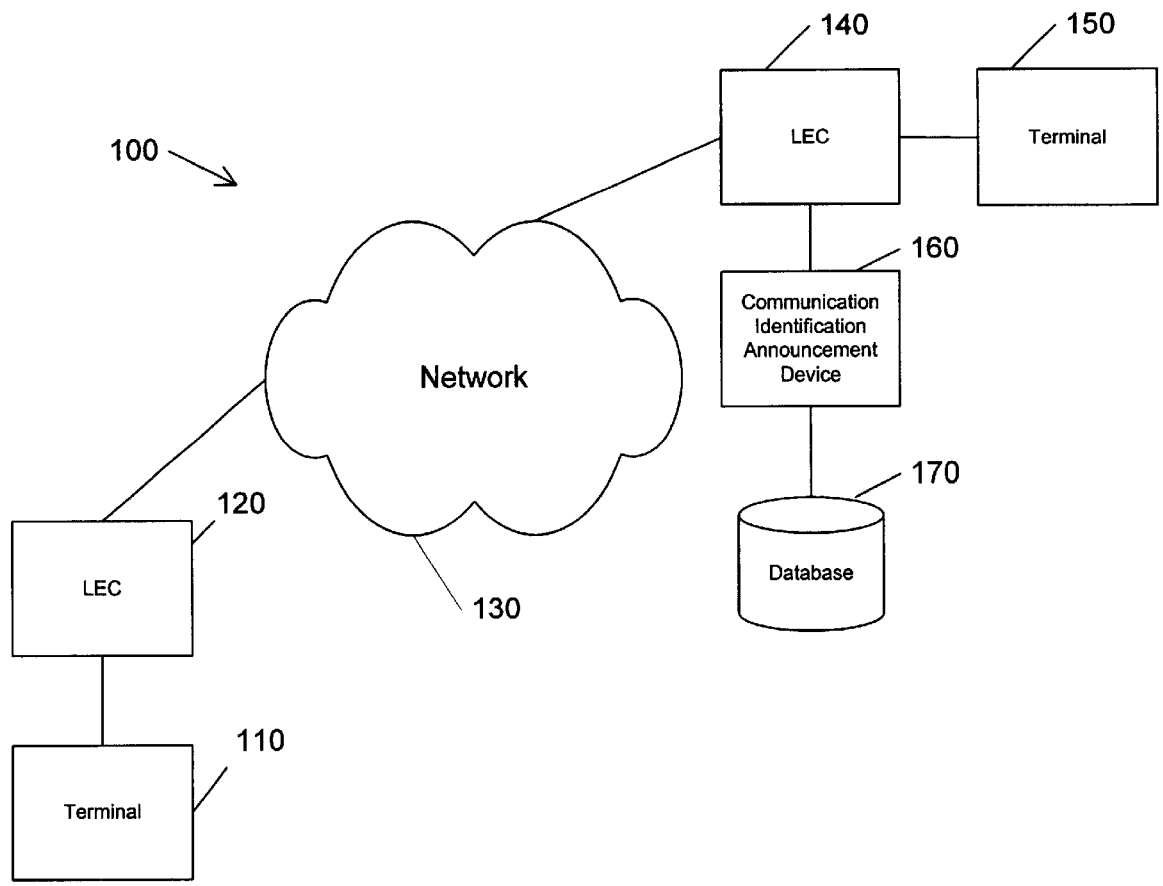
FIG. 1 shows an exemplary embodiment of a communication identification announcement system.

FIG. 1 shows an exemplary embodiment of a communication identification announcement system 100 that includes a communications network 130 coupled to several terminals 110, 150 via local exchange carriers ("LECs") 120, 140, respectively. In the exemplary embodiment of FIG. 1, a communication identification announcement device 160 is connected to LEC 140. However, the communication identification announcement device 160 may alternatively be connected to the network 130 or to a terminal of a subscriber, such as terminal 150.

A database 170 is connected to the communication identification announcement device 160. The database 170 may be stored on any memory device internal or external to the communication identification announcement device 160. In alternate embodiments, the database may be connected to network 130, LEC 140, or terminal 150. The database 170 may be referred to as a subscriber database as it may be personal to the subscriber. That I, the subscriber may exercise control over the database 170 and its contents.

The communications network 130 may be may be any type of network that carries communications including, for example, a public switched telephone network, the Internet, an intranet, a local area network (LAN), a wide area network (WAN), or any combination of communication and/or data-bearing networks including wireless networks.

The terminals 110, 150 may be, for example, telephone stations, personal computers, facsimile machines, pagers, wireless devices such as palm pilots or cellular telephones or any other device that at least receives communications. Any combinations of terminals are within the scope of the invention.

Figure 2:
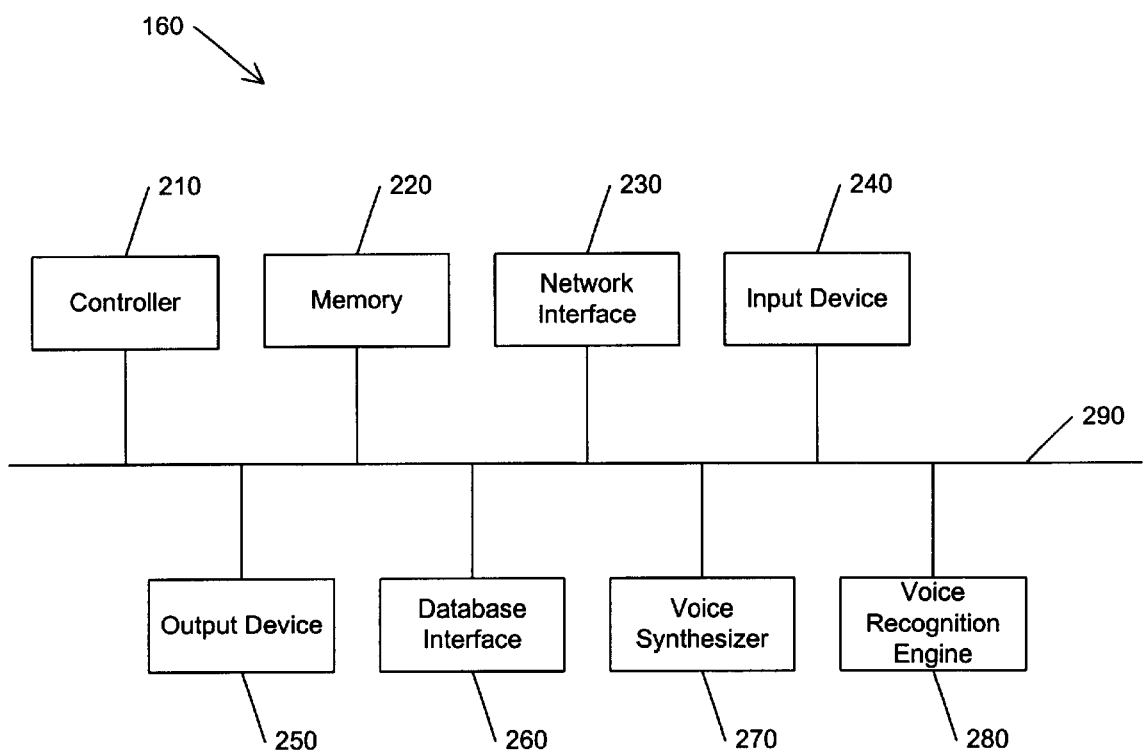
FIG. 2 illustrates an exemplary communication identification announcement device.

FIG. 2 illustrates an exemplary communication identification announcement device 160. The communication identification announcement device 160, may include a controller 210, a memory 220, a network interface 230, an input device 240, an output device 250, a database interface 260, a voice synthesizer 270, and a voice recognition engine 280, all coupled to bus 290. While the diagram of FIG. 2 illustrates the exemplary items 210, 220, 230, 240, 250, 260, 270, 280 included within a communication announcement device 160 as being coupled to a common bus 290, nothing herein should be construed as requiring the exemplary items 210, 220, 230, 240, 250, 260, 270, 280 to be collocated.

The controller 210 may control operations related to the audible announcement of an indication of an identity of a sender of a communication. The controller need not be dedicated to the communications identification announcement device 160. For example, the controller 210 may be used to perform an e-mail application.

The memory 220 may be any memory including, for example, static or dynamic random access memory, or flash memory. Memory 220 may store an operating system for user premises equipment and may store instructions required to perform a method in accordance with an embodiment of the invention. Memory 220 may also be used to store a database 170, but such database 170 may alternatively or additionally be stored in an alternative location, such as a data storage device such as, for example, a hard disk, CD-ROM, or tape drive.

The network interface 230 may, for example, be any sort of data transmission or receiving device, such as a modem, a network interface card, wireless device or a telephone line transceiver. The network interface 230 operatively couples a communications network 130 to the controller 210 via bus 290.

An input device 240, such as a microphone or any type of audio input unit, and/or a keypad or any type of data input unit, may be included with the communication identification announcement device 160. The input device 240 may be used to enter audio or data into the database 170.

An output device 250 may include any device or combination of devices that convert electrical signals to sound for audible announcement of an indication of an identity of a sender of a communication. Output device 250 may include, for example, a single speaker or a plurality of speakers, headphones, headsets, or any type of audio output unit. The output device 250 may be located with the communication identification device 160, but may alternatively be located remotely from the communication identification device 160. It is within the scope of the invention to include, as output device 250, for example, speakers coupled to a subscriber's home, entertainment system speakers coupled to a computer, speakers in the automobile of a subscriber, and speakers in any premises or portable equipment. Output device 250 may be coupled to controller 210 (and bus 290) via, for example, wireline, wireless, radio frequency, infrared, or optical links.

The database interface 260 provides an interface that couples the communication identification device 160 to a database 170 to give the controller 210 access to data including communication identifiers (to identify senders of communications) and audio files and/or data files mapped to the communication identifiers.

Voice synthesizer 270 may generate speech from data files stored in a database 170. The controller 210 may access the data files. The data files may be used to cross-reference a field containing a communication identifier to a field containing a message indicative of the identity of the party associated with the communication identifier. Controller 210 may access the database via database interface 260. The voice synthesizer 270 may generate electrical signals to be applied to output device 250 to audibly announce an indication of an identity of a sender of a communication. The database 170 may also contain audio files; the controller 210 may direct the contents of the audio files to the output device 250 without use of the voice synthesizer 270.

A voice recognition engine 280 may also be included within a communications identification announcement device 160. The voice recognition engine 280 may receive input from input device 240 via bus 290. The voice recognition engine 280 may be used, for example, to convert speech to text to store audible announcements as text files as opposed to storing them as audio files. Voice synthesizer 270 may then be used to convert the text into synthesized speech. The voice recognition engine 280 may be used to recognize a speech pattern of a calling party. In such an embodiment, a communication identifier may thus be the contacting party's speech pattern, which could be cross-referenced and mapped to an announcement of an indication of the identity of the contacting party.

The communications identification announcement device 160 may be implemented as standalone hardware with associated software or firmware. Alternatively, the communications identification announcement device 160 could be incorporated into a telephone, pager,; or computer of the subscribing party, by the addition of hardware and software/firmware as needed. The invention may be incorporated, for example, into wireline telephony, wireless telephony, facsimile, e-mail, or computer telephony applications and/or hardware. As used herein, computer refers to any computing device including standalone, laptop, and handheld computing devices.

Figure 3:
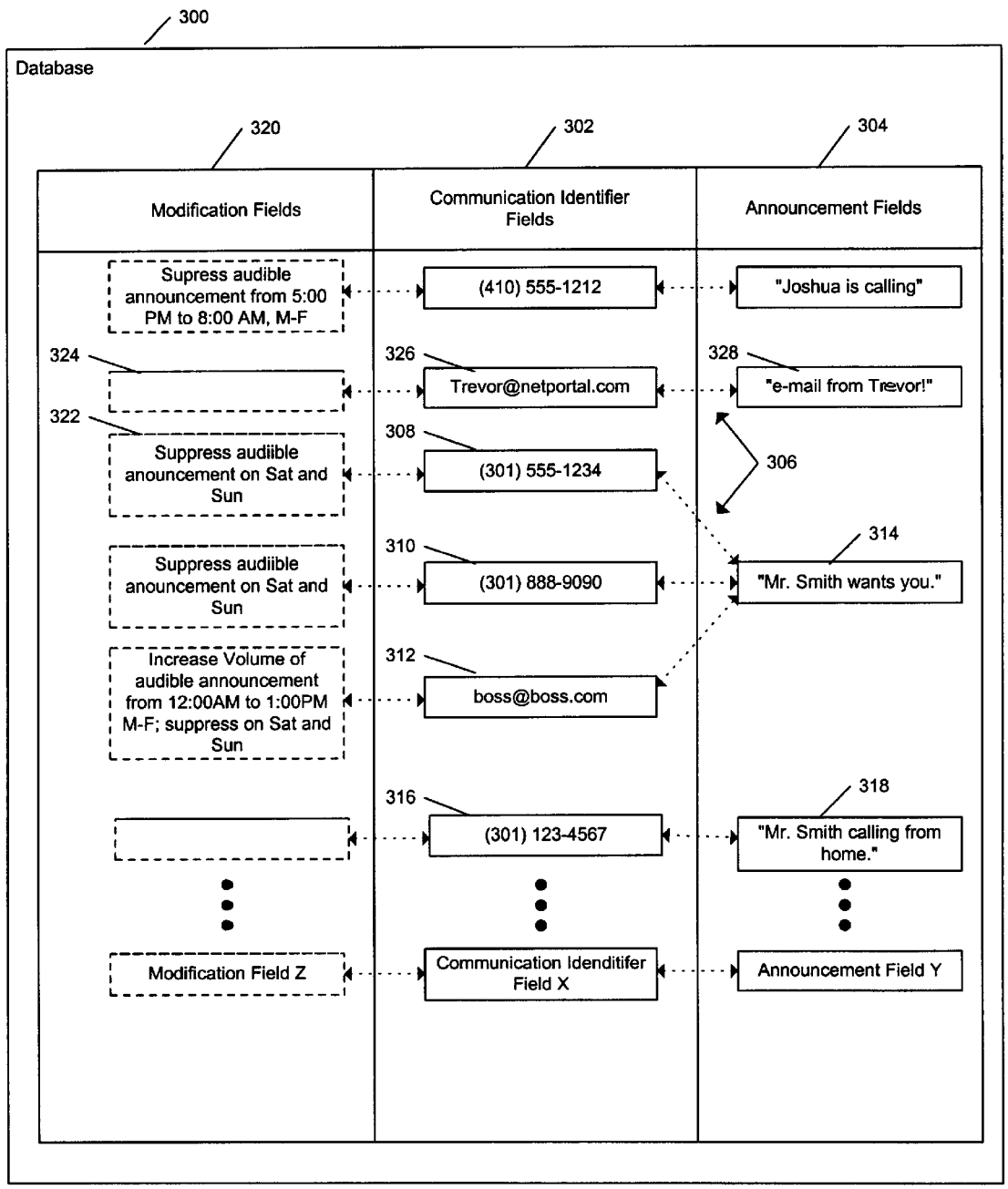
FIG. 3 is an exemplary diagram of a database structure in accordance with an embodiment of the invention.

FIG. 3 is an exemplary diagram of a database structure 300 in accordance with an embodiment of the invention. The database structure 300 may be stored in the database 170. The database structure 300 may be used in conjunction with telephony applications, e-mail applications, or any application involving a communication having a communication identifier with which to index the database. The database structure 300 may include a first plurality of fields 302 to store communication identifiers, and a second plurality of fields 304 to store communication identification announcements. For ease of explanation, the first plurality of fields 302 may be referred to as communication identifier fields 302, while the second plurality of fields 304 may be referred to as announcement fields 304. The communication identification announcements in the announcement fields 304 may be, for example, in the form of audio files and/or data files.

Individual fields in the communication identifier fields 302 may be mapped to individual fields in the announcement fields 304, as illustrated by dashed arrow-headed lines 306. Mapping may be in a many-to-one manner, or in a one-to-one manner. Mapping in a many-to-one manner may be used when a contacting party can send a communication to a contacted party from a multiple number of sources. For example, a contacting party may send a communication to a contacted party from an office telephone, a home telephone, a wireless telephone, a fax machine, or a computer hosting an e-mail application. In each instance, the contacting party is identical, only the type and method of transmitting the communication has changed. The contacted party may wish to associate all communications from the many possible location of a single contacting party to a single communication identification announcement. Thus, for example, multiple communication identifier fields 308, 310, 312, which may be the office telephone, wireless telephone, and computer hosting an e-mail application of a subscriber's supervisor, respectively, may each be mapped to a single announcement field 314. On the other hand, the subscriber may wish to use the communication identification announcement to identify not only the identity of the contacting party but also the sending location of the communication of the contacting party. In such an instance, a one-to-one mapping may be used as illustrated by the mapping of identifier field 316 to announcement field 318. In the example of FIG. 3, identifier field 316 may be associated with the home telephone of the subscribers supervisor.

Communication identification announcements may be in any format and may be stored in a compressed or uncompressed manner. An example of a communication identification announcement may be a formatted audio file in a .WAV file format. The communication identification announcement may include an indication of the identity of the contacting party in the contacting party's voice, in the contacted party's voice, or in a third party's voice. Examples of third party voices may include the voice of a family member (e.g., a child), an imitation or the actual voice of a celebrity, or the sound of a voice of a cartoon character. Other sounds of voices may, of course, be used without departing from the scope of the invention. Announcements included in the announcement fields 304 need not be limited to the sounds of voices. Any sound that provides an indication of the identity of the contacting party is included within the scope of the invention.

Communication identification announcements may be in the sound of a human voice or a synthesized voice. In the instance of a synthesized voice, a file used to indicate the identity of the contacting party to the contacted party might be a data file including text representative of a communication identification announcement the contacted party wishes to hear.

As an example, the indication of identity may be a verbalized name of the contacting party. The communication identification announcement file may include more information than the name of the contacting party and need not contain the name of the calling party. The contents are limited only by the imagination of the party recording the communication identification announcement, and the data storage limitations of the communications identification announcement device. For example, the communication identification announcement associated with a business telephone number of the spouse of the called party might contain the sounds of the words "Honey, its me pick up the phone" in the spouse's (the calling party's) voice. In another example, a communication identification announcement associated with the telephone number of a friend of the called party might contain the sounds of the words "Jim Smith" in the friend's (the calling party's) voice. In another example, the communication identification announcement associated with the telephone number of the stock broker of the called party might contain the sounds of the words "More bad news" in the called party's own voice. Other examples are illustrated in FIG. 3.

A communication identification announcement, stored, for example as an audio file may be recorded at any time and mapped to one or more communication identifier fields 302 in the database 300 by any means known to those of skill in the art. A subscriber may use a telephone keypad and associated handset to enter a communication identifier and a communication identifier announcement into the database 300. Alternatively, a subscriber may use a standalone communications identification device 160, having its own input device 240, to enter communication identifiers and communication identifier announcements into the database 300 via a database interface 260.

In general, a contacting party may record an announcement for storage in a subscriber database at any time before a subscriber receives a communication from the contacting party. In a telephony application, for example, the calling party may record an announcement and store it in the database 300 at any time before receipt of a telephone call by the contacted party. In an e-mail application, for example, the sending party may transmit an audio file for storage in the database 300 at any time before receipt of an e-mail by the contacted party.

The subscriber database may contain communication identifiers designated by the subscriber. The subscriber may designate which communication identifier is to be associated with a particular announcement. Designation of communication identifiers may, furthermore, allow a subscriber to authorize which contacting parties may store files in the database 300. In various embodiments, the subscriber may, for example, select to globally authorize such storage, restrict authorization to a subset of all possible contacting parties, or exclude authorization from in all contacting parties or a subset thereof. Any restrictions or exclusions may be based upon, for example, area codes, exchanges, billing telephone numbers, or combinations thereof. Likewise, the contacted party may preauthorize storage of files in the database 300 based upon certain e-mail addresses, or any other communication identifier of a communication from a contacting party. Furthermore, a contacted party may record an audio file in anticipation of receiving a call from a prospective contacting party. The audio file may then be stored in an announcement field 304 and mapped to a communication identifier 302 of the prospective contacting party.

One of ordinary skill in the art will understand that a file, such as an audio file identified in an announcement field 304, may be identified by a pointer or file name directed to the file; and that the file itself need not be stored in the database 300.

In another embodiment, at least some of the communication identifier fields 302 may additionally be mapped to modification fields 320. Modification fields may contain data to modify one or more aspects of the output of an associated announcement field 304. Modification may include, for example, altering the volume level of the communication identification announcement, or suppressing the audible announcement. The modification may be made as a function of time. For example, communication identifier field 308 could be mapped to a modification field 322, which includes data or instructions to the effect that between certain hours of the day and/or on certain days of the week or month, the announcement field 314, mapped to communication identifier field 308, is to be suppressed. Suppression may be used to not disturb the subscriber while the subscriber is, for example, at a meal, or is sleeping. This list is not meant to be limiting; a subscriber may choose other reasons, times, methods, etc. to modify any announcement field 304. Additionally, although a modification field 320 may be assigned to a communication identifier field 302, it need not contain any modification information. For example, modification field 324 may be mapped to communication identification field 326 and yet may not include instructions to modify announcement field 328. Thus, announcement field 328 may be output to output device 250 without any modification.

Communication identifier fields 302 may be mapped to modification fields 320 in the database 300 in a many-to-one manner, or in a one-to-one manner, similarly as described above in relation to communication identifier fields 302 mapped to announcement fields 304. Such mapping is not illustrated in FIG. 3 as it would unnecessarily increase the complexity of the figure, and such mapping should be readily understandable by those of skill in the art.

Communication identifier fields 302 are shown in FIG. 3 as a set of X fields; announcement fields 304 are shown as a set of Y fields; and modification fields 320 are shown as a set of Z fields. X, Y, and Z need not be equal. Furthermore, any field may be stored in the database 300 without the requirement that it be mapped to another field.

Figure 4:
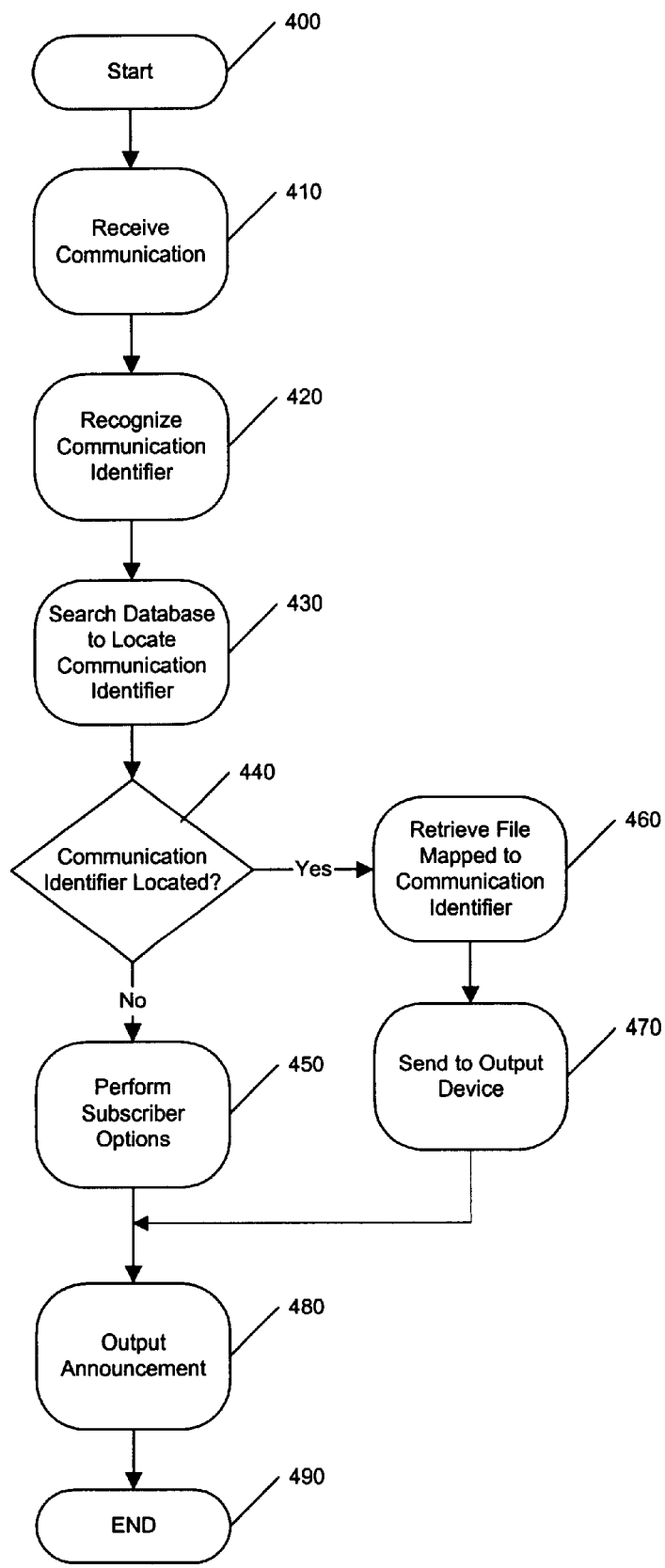
FIG. 4 is an exemplary flow diagram of a method of generating a communications identification announcement in accordance with an embodiment of the invention.

FIG. 4 is an exemplary flow diagram of a method of generating a communications identification announcement in accordance with an embodiment of the invention. The method may begin at step 400 and proceed sequentially to step 480. At step 410, a communication sent from a contacting party is transmitted to a subscriber and received by a communications identification announcement device 160 of the subscriber. The communication. may be, for example, a telephone call, an e-mail message, a facsimile, a short message service (SMS) communication, or a page (as received from a paging device). Any type or length of communication and any type of communication equipment are considered to be within the scope of the invention.

At step 420, the controller 210 in the,communications identification announcement device 160 recognizes a communication identifier of the communication of the contacting party. The communication identifier may be the billing number or telephone number of the calling party (obtained, for example, via use of automatic number identification ("ANI")), a calling line identification number, a telephone number, a personal identification number, an e-mail address, an Internet address, a Web page address, a Media Access Control (MAC) address, or a network layer address of the contacting party. Use of other communication identifiers is acceptable, without departing from the scope of the invention. Identification of the communication identifier may be accomplished in any manner known by those of skill in the art.

At step 430, the controller 210 searches a database 170 via database interface 260 to locate a match to the communication identifier of the communication. The database 170 may be stored in the communications identification announcement device 160, in the device that the subscriber will use to process the communication of the contacting party (e.g., a terminal 150), or in any location that allows controller 210 to have access to the database 170.

At step 440, if the communication identifier is not located in the database 170, then subscriber options may be performed at step 450. Subscriber options may include selecting a default announcement file 304 including an announcement to alert the subscriber of the lack of a communication identifier in the database. For example the announcement may contain the sounds of the words "New contacting party" or whatever sounds of words the subscriber might like to pre-record for this circumstance.

Another subscriber option may involve prompting the contacting party to provide input for an audio file to be stored and mapped to the communication identifier field 302. The controller 210 may store a number representative of a total number of times a contacting party was prompted to provide input for an audio file. If the total number exceeds a threshold value, then a prerecorded audio file may be mapped to the communication identifier of the party that transmitted the communication.

Another subscriber option may be to use the voice synthesizer 270 to audibly announce the unidentified communication identifier to the subscriber. For example, the voice synthesizer may generate a signal to audibly announce the billing telephone number or e-mail address-of the contacting party. This option may be accomplished using a text-to-speech voice synthesis application. Text may be derived from the text of the communication identifier, which is extracted from the communication of the contacting party. Other methods of generating audible announcements as well as other subscriber options are included within the scope of the invention.

If, at step 440, the communication identifier is located in the database 170, then at step 460, an audio file, for example, which may have been stored in the database 170 prior to the receipt of the communication, and which is mapped to the located communication identifier, may be retrieved. At step 470, the file may be sent to the output device 250 of the communication identification announcement device 160 via bus 290.

At step 480 any retrieved file from steps 450 or 470, or any other output generated as a result of a subscriber option at step 450, may be output to the subscriber's terminal 150.

After output of the audible announcement at step 480 is complete, the method ends at step 490.

The disclosed embodiments are illustrative of the various ways in which the present invention may be practiced. Other embodiments can be implemented by those skilled in the art without departing from the spirit and scope of the present invention.

What is claimed is:

1. A method of generating an audible communication identification announcement associated with a communication from a contacting party to a subscriber, the communication having a communication identifier, comprising:

receiving the communication;

locating the communication identifier in a subscriber database, the subscriber database containing one or more communication identifiers designated by the subscriber, each designated communication identifier corresponding to a particular contacting party;

retrieving an audio file corresponding to the located communication identifier if the communication identifier is located in the subscriber database;

outputting the contents of the audio file; and if the communication identifier is not located in the subscriber database:
  prompting the contacting party to provide input for the audio file to be stored and mapped to the communication identifier of the contacting party;
  storing a number representative of a total number of times the contacting party was prompted to provide input for the audio file, wherein if the total number exceeds a predetermined threshold value, then:
  storing a prerecorded audio file mapped to the communication identifier of the contacting party; and
  outputting the contents of the prerecorded audio file.

2. The method of claim 1, wherein the communication is one of a telephone call, an e-mail message, a facsimile transmission, a short message service (SMS) communication, and a page.

3. The method of claim 1, wherein the communication identifier is at least one of a billing number, a calling line identification number, a telephone number, a personal identification number, an e-mail address, an Internet address, a Web page address, a MAC address and a network layer address.

4. The method of claim 1, wherein the audio file includes an indication of an identity of the contacting party.

5. The method of claim 1, wherein the audio file is stored in the subscriber database before receipt of the communication from the contacting party.

6. The method of claim 1, wherein the audio file is recorded in a voice of one of the contacting party, the subscriber, and a third party.

* * * * *

UNITED STATES PATENT AND TRADEMARK OFFICE
CERTIFICATE OF CORRECTION

PATENT NO. : 6,570,983 B1
DATED : May 27, 2003
INVENTOR(S) : Speeney et al.

It is certified that error appears in the above-identified patent and that said Letters Patent is hereby corrected as shown below:

Title page,
Item [57], ABSTRACT,
Line 4, change "embodiment the method. Includes" to -- embodiment, the method includes --;

Column 2,
Line 49, change "and "Sending" will" to -- and "sending" will --;

Column 4,
Line 10, change "home, entertainment system" to -- home entertainment system --;
Line 53, change "pager,; or computer" to -- pager, or computer --;

Column 7,
Line 45, change "The communication. may" to -- The communication may --;
Line 51, change "in the, communications"to -- in the communications --

Column 8,
Line 28, change "address-of the" to -- address of the --.

Signed and Sealed this

Twenty-second Day of June, 2004

JON W. DUDAS
*Acting Director of the United States Patent and Trademark Office*